UNITED STATES PATENT OFFICE.

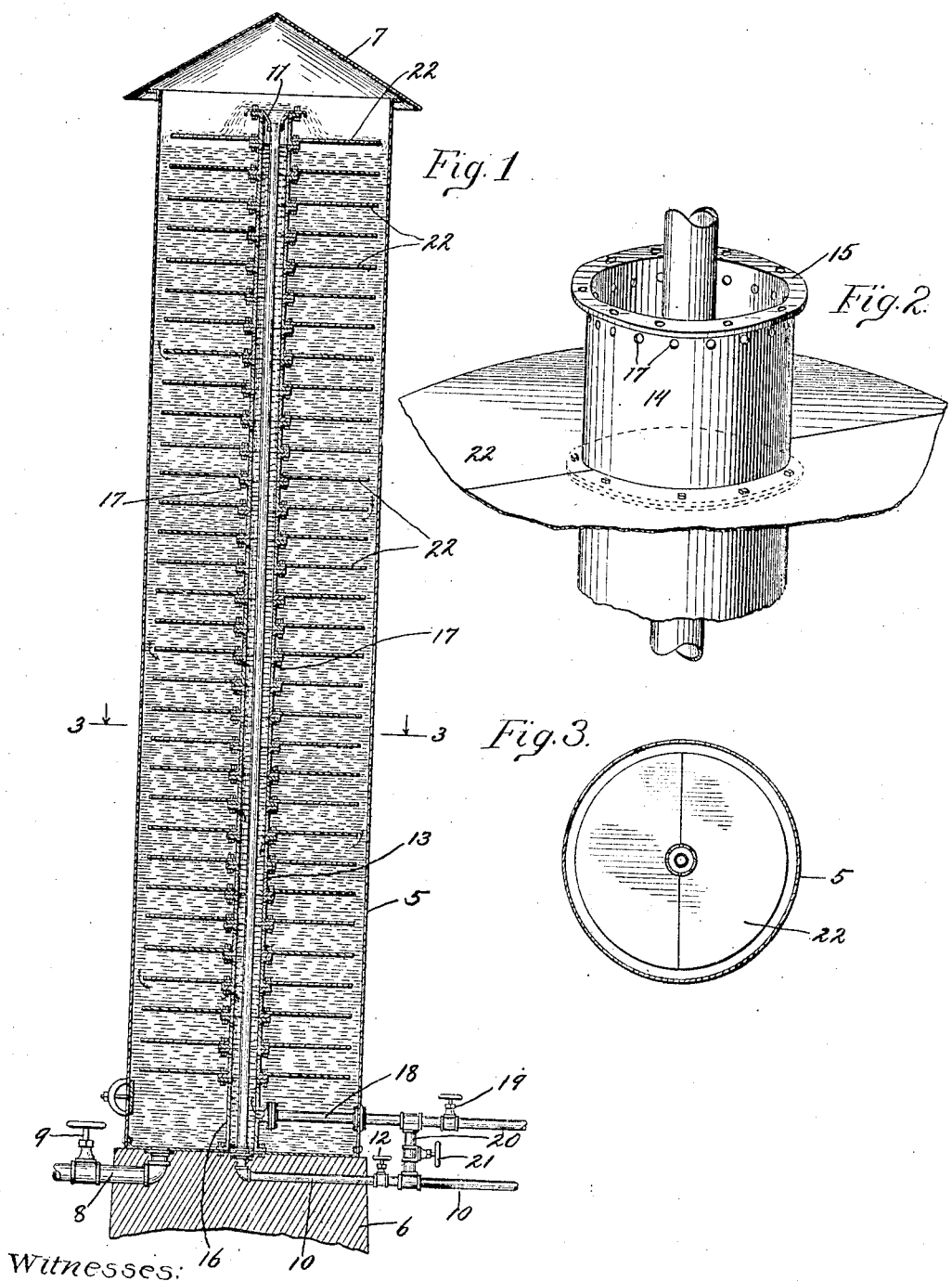

WILLIAM M. JEWELL, OF WINNETKA, AND WALTER WAGNER, OF BERWYN, ILLINOIS, ASSIGNORS OF ONE-THIRD TO OMAR H. JEWELL, OF CHICAGO, ILLINOIS.

WATER-PURIFYING APPARATUS.

No. 882,005.  Specification of Letters Patent.  Patented March 17, 1908.

Application filed November 15, 1902. Serial No. 131,574.

*To all whom it may concern:*

Be it known that we, WILLIAM M. JEWELL and WALTER WAGNER, citizens of the United States, residing, respectively, at Winnetka and Berwyn, in the county of Cook and State of Illinois, have invented certain new and useful Improvements in Water-Purifying Apparatus, of which the following is a specification, reference being had to the accompanying drawings.

Our invention relates to apparatus for purifying water, and has particularly to do with the removal from water of sedimentary impurities, whether they be of natural origin or the result of chemical action induced by the addition to the water of precipitating or coagulating reagents. As is generally understood, it is a common practice in connection with filtration plants to employ subsidence tanks or basins, through which the water to be purified passes, and which are designed to provide an opportunity for the settling of sedimentary matter produced by the use of coagulating reagents. Such subsidence basins have been of various forms and styles of construction; but, so far as we are aware, in none of them has there been any provision for subdividing the mass of water into a multiplicity of substantially quiescent zones or strata, with means for separately collecting and retaining the sediment deposited from the water in each zone, and with means for withdrawing the purified water lying in the upper portion of each zone. This, generally speaking, is the principal feature of our present invention. The practice heretofore has been to conduct the water through a suitable basin or tank, the sediment being deposited from the water as it passed through said tank; but such systems are ineffective, for various reasons.

In the first place, where the sediment must settle to the bottom of a receptacle, it settles comparatively quickly from the upper part of the mass of water, but the rate of subsidence decreases with the depth of the water, so that in the greater depths the rate of subsidence is very slow. Moreover, while subsidence is taking place it is practicable to draw off the water only from the upper part of the mass, as otherwise the impurities are agitated and pass out with the outflowing water. Consequently, in subsidence apparatus as heretofore constructed, inasmuch as there has been no provision for subdividing the mass of water and permitting the subdivided masses to deposit their sediment separately, the process of purification has been very slow and unsatisfactory; so that the apparatus heretofore in use has not given satisfactory results, particularly when used in connection with large filtering plants constructed to filter the water-supply of municipalities and large establishments.

By subdividing the mass of water, in accordance with our invention, the settling of the sediment proceeds simultaneously in the different zones; the time required for the depositing of the sediment in any one zone being only a small fractional part of the time that would be required if the water were not subdivided. For example, in a tank thirty feet deep, if the water were not subdivided the sediment would be deposited from the uppermost foot of water in a few minutes; but it would not be deposited from the entire body of water for many hours. Moreover, with the water unsubdivided, the sediment from all the upper part of the body of water would have to pass down through the water until it reached the bottom of the tank, and as the sediment became denser it would naturally be deposited more slowly, thus increasing the time required for the purification of the entire body. Assuming, however, the tank to be subdivided into thirty zones by plates arranged to catch and retain the sediment deposited, the water would thereby be divided into thirty zones of equal depth, and the sediment from the water in each zone would be deposited upon the plate immediately below it; consequently, as the greatest distance any particle of sediment would have to descend would be one foot, the entire mass of water would be purified in the same length of time that would be required for purifying the uppermost foot of water in an unsubdivided tank. Furthermore, by providing for the discharge of the purified water from the upper part of each zone, a multiplicity of outlets is secured; consequently a much greater volume of water may be caused to flow continuously through the tank, without causing a sufficient current to interfere with proper sedimentation, than it would be possible to secure otherwise.

In addition to the principal features above pointed out, our invention also includes certain features of construction by which provision is made for advantageously supplying water to the subsidence apparatus, for withdrawing it therefrom, and for washing out the apparatus so as to remove the sediment collected therein.

In the accompanying drawings,—Figure 1 is a vertical section of our improved apparatus; Fig. 2 is an enlarged detail, being a perspective view of a part of the apparatus; and Fig. 3 is a cross section on line 3—3 of Fig. 1.

Referring to the drawings,—5 indicates the tank, which may be of any desired height and size. It is mounted on a suitable base, and is preferably provided with a cover 7.

8 indicates an outlet pipe opening into the bottom of the tank 5, as shown in Fig. 1, for the removal of wash-water and sediment; said pipe being provided with a valve 9, which is closed except when the tank is to be washed out.

10 indicates an inlet pipe, which rises preferably through the center of the tank, and terminates at the upper end thereof, where, in the construction shown, it is provided with a funnel 11. The water, rising through the pipe 10, is discharged over the edges of the funnel, as shown in Fig. 1.

12 indicates a valve for the pipe 10.

13 indicates a tube, which, in the construction shown, is formed of a series of rings 14 placed end to end, each of said rings having at its ends flanges 15, which are secured together by bolts or equivalent means, thus forming a continuuos pipe extending from near the bottom to the top of the tank. In the construction shown, the lowermost ring is mounted upon a tubular support 16 secured upon the bottom of the tank around the pipe 10, and the rings 14 are also fitted upon the pipe 10 in the manner shown in Fig. 1. A central passage is thus provided surrounding the pipe 10, which passage is used for the discharge of the purified water, which gains access thereto through a series of perforations 17 provided near the upper portion of each ring 14, as shown in Fig. 2 and as indicated by the arrows in Fig. 1.

18 indicates a pipe which communicates with the pipe 13, being preferably connected with the section 16, as shown in Fig. 1. The pipe 18 is provided with a valve 19, and is connected by a connection 20 with the pipe 10, a valve 21 being provided for controlling the flow of water from one of said pipes to the other, as shown in Fig. 1.

22 indicates a series of plates formed in two parts, said plates being fitted upon the pipe 13 at intervals throughout the length thereof, as shown in Fig. 1. Said plates rest upon the lower flanges 15, and are suitably secured thereto by bolts or equivalent means. The plates 22 are slightly less in diameter than the tank 5, so as to permit the water discharged into the upper part of the tank to pass down and fill it, and they are so arranged in the chamber as to receive and retain the sediment deposited upon them. In the construction illustrated the plates are horizontally arranged as they are so best adapted to receive and retain the sediment, but our invention is not limited to the arrangement of the plates exactly horizontally as they may be otherwise arranged provided their capacity to retain the sediment deposited upon them is preserved. The term "horizontally" as employed in the claims should therefore be construed accordingly.

The operation is as follows: The water to be purified enters the tank through pipe 10, being discharged through the funnel 11 and falling upon the uppermost plate 22. As the tank is filled, the spaces between the different plates 22 are filled, the water thus being divided into a series of zones or strata. The discharge orifices 17 being immediately below the different plates 22, it is evident that the water in the upper part of each stratum may escape into the pipe 13, thence passing down into pipe 18, whence it may be conducted to any desired point, for filtering, &c. It is also evident that as the sediment in the water in any stratum falls, it will be deposited upon the plate immediately below it and be retained thereby, so that the operation of subsidence, so far as the different zones is concerned, is practically independent in each zone; consequently the operation is conducted rapidly, for reasons already set forth. As the water drawn off is taken from the upper part of each zone, it is possible to conduct the operation continuously and at the same time to obtain a much larger volume than would be secured if the separate zones of subsidence were not provided.

When the different plates have accumulated sufficient sedimentary matter to make it desirable to cleanse them, the valves 12 and 19 are closed and the valves 9 and 21 opened. The water in pipe 10 is thereby conducted to pipe 18, and rises through pipe 13, being discharged through the orifices 17 upon the surfaces of the plate 22, thereby washing the sediment from such plates and causing it to fall to the bottom of the tank, whence it passes out through the pipe 8.

We wish it to be understood that while we consider the apparatus shown in the drawings to be the best embodiment of our invention, we do not restrict ourselves to such construction, as many modifications may be made without departing from our invention.

That which we claim as our invention and desire to secure by Letters Patent is,—

1. A subsidence-apparatus, consisting of a chamber, means dividing said chamber into a plurality of zones and arranged to receive and retain sediment deposited in said zones, and means communicating with the upper portions of said zones for drawing off liquid therefrom.

2. A subsidence-apparatus, consisting of a chamber, means dividing said chamber into a plurality of zones, and arranged to receive and retain sediment deposited in said zones, means communicating with the upper portions of said zones for drawing off liquid therefrom, and means for supplying liquid simultaneously to a plurality of said zones.

3. A subsidence-apparatus, consisting of a chamber, means dividing said chamber into a plurality of zones and arranged to receive and retain sediment deposited in said zones, means communicating with the upper portions of said zones for drawing off liquid therefrom, and means for washing out the accumulated sediment from said zones, substantially as described.

4. A subsidence-apparatus, consisting of a chamber, means dividing said chamber into a plurality of zones and arranged to receive and retain sediment deposited in said zones, and means for continuously supplying liquid to said zones and means communicating with the upper portions of said zones for continuously discharging liquid from the upper portions thereof.

5. A subsidence-apparatus, consisting of a chamber, means dividing said chamber into a plurality of zones and arranged to receive and retain sediment deposited in said zones, means for supplying liquid to said chamber, and outlets communicating with the upper portions of said zones for the discharge of the liquid.

6. A subsidence-apparatus, consisting of a chamber, means dividing said chamber into a plurality of zones and arranged to receive and retain sediment deposited in said zones, and an inlet-pipe opening into the upper portion of said chamber for admitting liquid thereto, said chamber having discharge-passages communicating with the upper portion of each zone for the discharge of liquid therefrom.

7. A subsidence-apparatus, consisting of a chamber, an inlet-pipe extending up through said chamber and opening into the upper portion thereof, an outlet-passage around said inlet-pipe, means dividing said chamber into a plurality of zones and arranged to receive and retain sediment deposited in said zones, and passages at the upper portion of each zone communicating with said outlet-passage, substantially as described.

8. A subsidence-apparatus, consisting of a chamber, horizontally-disposed sediment collecting and retaining plates dividing said chamber into a plurality of zones, said chamber having outlets near the upper portion of each zone for the discharge of liquid therefrom, and means for introducing liquid through said outlets for washing out the accumulated sediment, substantially as described.

9. A subsidence-apparatus, consisting of a chamber having an inlet-pipe discharging into the upper portion thereof, an outlet-pipe, sediment-collecting plates dividing said chamber into a plurality of zones, said outlet-pipe having openings near the upper portion of each zone, a pipe connecting said inlet and outlet pipes, and valve-mechanism for controlling the flow of water through said outlet-pipe, substantially as described.

10. A subsidence-apparatus, consisting of a chamber, means dividing said chamber into a plurality of zones and arranged to separately collect sediment deposited from the water in each zone, and means communicating with the upper portions of the zones for withdrawing the purified water therefrom.

11. A subsidence-apparatus, consisting of a chamber, a plurality of horizontal plates impervious to water arranged to collect and retain sediment, said plates being arranged one above another in said chamber, means for supplying water to said plates, and outlets communicating with the upper portion of the space above each plate.

12. A subsidence-apparatus, consisting of a chamber, a plurality of horizontal sediment collecting and retaining plates arranged one above another therein, and means for causing the water to be purified to flow inward over said plates and out at the center of the chamber above the several plates.

WILLIAM M. JEWELL.
WALTER WAGNER.

Witnesses:
JOHN L. JACKSON,
JULIA M. BRISTOL.